US012051531B2

(12) United States Patent
Takahashi et al.

(10) Patent No.: US 12,051,531 B2
(45) Date of Patent: Jul. 30, 2024

(54) COIL COMPONENT AND ITS MANUFACTURING METHOD

(71) Applicant: TDK Corporation, Tokyo (JP)

(72) Inventors: Nobuya Takahashi, Tokyo (JP); Naoaki Fujii, Tokyo (JP); Tomonaga Nishikawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 797 days.

(21) Appl. No.: 16/972,471

(22) PCT Filed: Jun. 5, 2019

(86) PCT No.: PCT/JP2019/022284
§ 371 (c)(1),
(2) Date: Dec. 4, 2020

(87) PCT Pub. No.: WO2019/235510
PCT Pub. Date: Dec. 12, 2019

(65) Prior Publication Data

US 2021/0233698 A1 Jul. 29, 2021

(30) Foreign Application Priority Data

Jun. 8, 2018 (JP) ................................ 2018-110141

(51) Int. Cl.
*H01F 27/28* (2006.01)
*H01F 27/29* (2006.01)
(Continued)

(52) U.S. Cl.
CPC ......... *H01F 27/2804* (2013.01); *H01F 27/29* (2013.01); *H01F 27/323* (2013.01);
(Continued)

(58) Field of Classification Search
CPC .......... H01F 2027/2809; H01F 27/323; H01F 27/2804
(Continued)

(56) References Cited

U.S. PATENT DOCUMENTS 7,408,435 B1 * 8/2008 Nishikawa .......... H01F 17/0006 336/200
8,174,349 B2 * 5/2012 Yoshida .................. H01G 4/33 336/200
(Continued)

FOREIGN PATENT DOCUMENTS

JP 2004-095860 A 3/2004
JP 2017-098544 A 6/2017

OTHER PUBLICATIONS

International Search Report issued in corresponding International Patent Application No. PCT/JP2019/022284, dated Jul. 23, 2019, with English translation.

*Primary Examiner* — Shawki S Ismail
(74) *Attorney, Agent, or Firm* — Rimon P.C.

(57) ABSTRACT

A coil component includes spiral conductor patterns S1 and S2 and insulating resin layers that cover the spiral conductor patterns S1 and S2, respectively. An outermost turn of the spiral conductor pattern S1 has a widened part. As a result, an outer wall surface part constituting the outer wall surface of the outermost turn in the radial direction and an outer wall surface part constituting the outer wall surface of the outermost turn of the spiral conductor pattern S2 in the radial direction differ in radial position from each other. Overlap of the insulating resin layers in the lamination direction is reduced to suppress thermal expansion or contraction of the insulating resin layers in the lamination direction at the overlap. This can relieve a stress applied to the interface between the spiral conductor pattern and the insulating resin layer.

8 Claims, 11 Drawing Sheets

(51) Int. Cl.
*H01F 27/32* (2006.01)
*H01F 41/04* (2006.01)
*H01F 41/12* (2006.01)

(52) U.S. Cl.
CPC ......... *H01F 41/041* (2013.01); *H01F 41/122* (2013.01); *H01F 2027/2809* (2013.01)

(58) Field of Classification Search
USPC .......................................................... 336/200
See application file for complete search history.

(56) References Cited

U.S. PATENT DOCUMENTS

| | | | | |
|---|---|---|---|---|
| 8,188,828 | B2 * | 5/2012 | Noma | H01F 17/0013 336/200 |
| 9,312,587 | B2 * | 4/2016 | Lee | H01F 41/046 |
| 10,014,100 | B2 * | 7/2018 | Nakamura | H01F 17/04 |
| 2008/0129439 | A1 | 6/2008 | Nishikawa et al. | |
| 2015/0102890 | A1 * | 4/2015 | Nakamura | H01F 27/2804 336/200 |
| 2017/0053727 | A1 * | 2/2017 | Eshima | H01F 41/0206 |
| 2017/0092414 | A1 * | 3/2017 | Ishikawa | H01F 27/2804 |
| 2017/0148562 | A1 | 5/2017 | Lee et al. | |
| 2019/0043655 | A1 * | 2/2019 | Kato | H01F 17/0013 |
| 2019/0156986 | A1 * | 5/2019 | Lim | H01F 27/323 |
| 2021/0272743 | A1 * | 9/2021 | Kato | H01F 27/292 |

* cited by examiner

COIL COMPONENT AND ITS MANUFACTURING METHOD

CROSS REFERENCE

This application is the U.S. National Phase under 35 US.C. § 371 of International Application No. PCT/JP2019/022284, filed on Jun. 5, 2019, which claims the benefit of Japanese Application No. 2018-110141, filed on Jun. 8, 2018, the entire contents of each are hereby incorporated by reference.

TECHNICAL FIELD

The present invention relates to a coil component and its manufacturing method and, more particularly, to a laminated coil component having a plurality of spiral conductor patterns and a plurality of insulating resin layers which are alternately laminated and a manufacturing method for such a coil component.

BACKGROUND ART

As a laminated coil component in which a plurality of spiral conductor patterns and a plurality of insulating resin layers are alternately laminated, there is known a coil component described in Patent Document 1. The coil component described in Patent Document 1 has four layers of spiral conductor patterns, in which a spiral conductor pattern of the lowermost layer is connected to one external terminal through a first electrode pattern, and a spiral conductor pattern of the uppermost layer is connected to the other external terminal through a second electrode pattern.

Further, the coil component of Patent Document 1 has a magnetic layer above and below the laminated spiral conductor patterns and the inner diameter portions thereof and thus has an increased inductance.

CITATION LIST

Patent Document

[Patent Document 1] JP 2017-098544 A

SUMMARY OF INVENTION

Problem to be Solved by the Invention

However, a conductive material used to constitute the spiral conductor pattern and electrode pattern and a resin material used to constitute the insulating resin layer significantly differ in thermal expansion coefficient, which may apply a stress to the interface therebetween due to a temperature change. In particular, the insulating resin layer that covers the spiral conductor pattern from radial outside may sometimes become comparatively large in volume and, in this case, a high stress is disadvantageously applied between the radially outer wall surface of the outermost turn of the spiral conductor pattern and the insulating resin layer that contacts the outer wall surface. Further, the electrode pattern has a pattern width larger than that of each turn constituting the spiral conductor pattern, so that a high stress is also likely to be applied to the interface between the electrode pattern and the insulating resin layer.

It is therefore an object of the present invention to provide a laminated coil component in which a plurality of spiral conductor patterns and a plurality of insulating resin layers are alternately laminated, capable of relieving a stress applied to the interface between a conductive material and a resin material. Another object of the present invention is to provide a manufacturing method for such a coil component.

Means for Solving the Problem

A coil component according to the present invention includes a plurality of laminated spiral conductor patterns and an insulating resin layer that covers the surfaces of turns constituting each of the plurality of spiral conductor patterns. The plurality of spiral conductor patterns include first and second spiral conductor patterns which are adjacent to each other in the lamination direction. The first spiral conductor pattern includes a first turn, and the second spiral conductor pattern includes a second turn that overlaps the first turn as viewed in the lamination direction. A first outer wall surface part constituting the radial outer wall surface of the first turn and a second outer wall surface part constituting the radial outer wall surface of the second turn have portions different in radial position.

According to the present invention, the radial positions of the first outer wall surface part and second outer wall surface part are misaligned, so that the overlap in the lamination direction between the insulating resin layer that covers the first outer wall surface part and the insulating resin layer that covers the second outer wall surface part can be reduced. This suppresses thermal expansion or contraction of the insulating resin layers in the lamination direction at the overlap, whereby it is possible to relieve a stress applied to the interface between the first and second outer wall surface parts and the insulating resin layers.

In the present invention, a first inner wall surface part constituting the radial inner wall surface of the first turn and a second inner wall surface part constituting the radial inner wall surface of the second turn may be at the same radial position. Thus, the radial positions of the first outer wall surface part and second outer wall surface part can be misaligned by making the widths of the first and second turns differ from each other.

In the present invention, the first turn may be the outermost turn of the first spiral conductor pattern, and the second turn may be the outermost turn of the second spiral conductor pattern. This can relieve a stress at a portion where a maximum stress is applied to the interface between a conductive material and a resin material.

The coil component according to the present invention may further include a first electrode pattern positioned radially outside the first outer wall surface part and connected to the outer peripheral end of the first spiral conductor pattern. This can relieve a stress applied to the interface between the first electrode pattern and the insulating resin layer.

The coil component according to the present invention may further include a second electrode pattern positioned radially outside the second outer wall surface part and connected to the first electrode pattern. This can relieve a stress applied to the interface between the second electrode pattern and the insulating resin layer.

In the present invention, the second outer wall surface part may overlap the outermost turn of the first spiral conductor pattern as viewed in the lamination direction, and an inner wall surface part of the first electrode pattern may overlap the second electrode pattern as viewed in the lamination direction. This can further reduce the overlap in the lamination direction between the insulating resin layer that covers the first outer wall surface part and the insulating resin layer that covers the second outer wall surface part.

In the present invention, the first outer wall surface part may overlap the second electrode pattern as viewed in the lamination direction. This can still further reduce the overlap in the lamination direction between the insulating resin layer that covers the first outer wall surface part and the insulating resin layer that covers the second outer wall surface part.

In the present invention, the radial thickness of the insulating resin layer embedded between the first electrode pattern and the first outer wall surface part may be equal to the radial thickness of the insulating resin layer embedded between the second electrode pattern and the second outer wall surface part. This can suppress an increase in the planar size of the coil component.

In the present invention, the plurality of spiral conductor patterns may further include a third spiral conductor pattern adjacent to the second spiral conductor pattern in the lamination direction, and the second outer wall surface part and a third outer wall surface part constituting the radial outer wall surface of the outermost turn of the third spiral conductor pattern may have portions different in radial position. As a result, the overlap in the lamination direction between the insulating resin layer that covers the second outer wall surface part and the insulating resin layer that covers the third outer wall surface part can be reduced. This suppresses thermal expansion of the insulating resin layers in the lamination direction at the overlap, whereby it is possible to relieve a stress applied to the interface between the first to third outer wall surface parts and the insulating resin layers.

In the present invention, the second outer wall surface part may overlap the outermost turn of the third spiral conductor pattern as viewed in the lamination direction. This can further reduce the overlap in the lamination direction between the insulating resin layer that covers the second outer wall surface part and the insulating resin layer that covers the third outer wall surface part.

In the present invention, the first outer wall surface part and third outer wall surface part may have portions which are the same in radial position. This can suppress an increase in the planar size of the coil component.

In the present invention, the number of turns of the first spiral conductor pattern and the number of turns of the second spiral conductor pattern may be different by one or more. Thus, a misalignment can be produced between the radial positions of the wall surface parts adjacent in the lamination direction by the difference in the number of turns.

A manufacturing method for a coil component according to the present invention includes: a first step of forming a first spiral conductor pattern; a second step of forming a first insulating resin layer that covers the surfaces of turns constituting the first spiral conductor patterns; a third step of forming, on the surface of the first insulating resin layer, a second spiral conductor pattern that overlaps the first spiral conductor pattern; and a fourth step of forming a second insulating resin layer that covers the surfaces of turns constituting the second spiral conductor pattern. The first spiral conductor pattern includes a first turn, and the second spiral conductor pattern includes a second turn that overlaps the first turn as viewed in the lamination direction. A first outer wall surface part constituting the radial outer wall surface of the first turn and a second outer wall surface part constituting the radial outer wall surface of the second turn have portions different in radial position.

According to the present invention, the radial positions of the first outer wall surface part and second outer wall surface part are misaligned, so that the overlap in the lamination direction between the insulating resin layer that covers the first outer wall surface part and the insulating resin layer that covers the second outer wall surface part can be reduced. This suppresses thermal expansion of the insulating resin layers in the lamination direction at the overlap, whereby it is possible to relieve a stress applied to the interface between the first and second outer wall surface parts and the insulating resin layers.

In the present invention, a first inner wall surface part constituting the radial inner wall surface of the first turn and a second inner wall surface part constituting the radial inner wall surface of the second turn may be at the same radial position. Thus, the radial positions of the first outer wall surface part and second outer wall surface part can be misaligned by making the widths of the first and second turns differ from each other.

In the present invention, the first turn may be the outermost turn of the first spiral conductor pattern, and the second turn may be the outermost turn of the second spiral conductor pattern. This can relieve a stress at a portion where a maximum stress is applied to the interface between a conductive material and a resin material.

In the first step, a first electrode pattern positioned radially outside the first outer wall surface part and connected to the outer peripheral end of the first spiral conductor pattern may be formed at the same time with the first spiral conductor pattern. This can prevent peeling or other failures of the insulating resin layer embedded between the first outer wall surface part and the first electrode pattern.

In the third step, a second electrode pattern positioned radially outside the second outer wall surface part and connected to the first electrode pattern may be formed at the same time with the second spiral conductor pattern. This can prevent peeling or other failures of the insulating resin layer embedded between the second outer wall surface part and the second electrode pattern.

In the present invention, the number of turns of the first spiral conductor pattern and the number of turns of the second spiral conductor pattern may be different by one or more. Thus, a misalignment can be produced between the radial positions of the wall surface parts adjacent in the lamination direction by the difference in the number of turns.

Advantageous Effects of the Invention

As described above, according to the present invention, it is possible to relieve a stress applied to the interface between a conductive member constituting the spiral conductor pattern and the insulating resin layer that covers the conductive member.

MODE FOR CARRYING OUT THE INVENTION

Preferred embodiments of the present invention will be explained below in detail with reference to the accompanying drawings.

Figure 1:
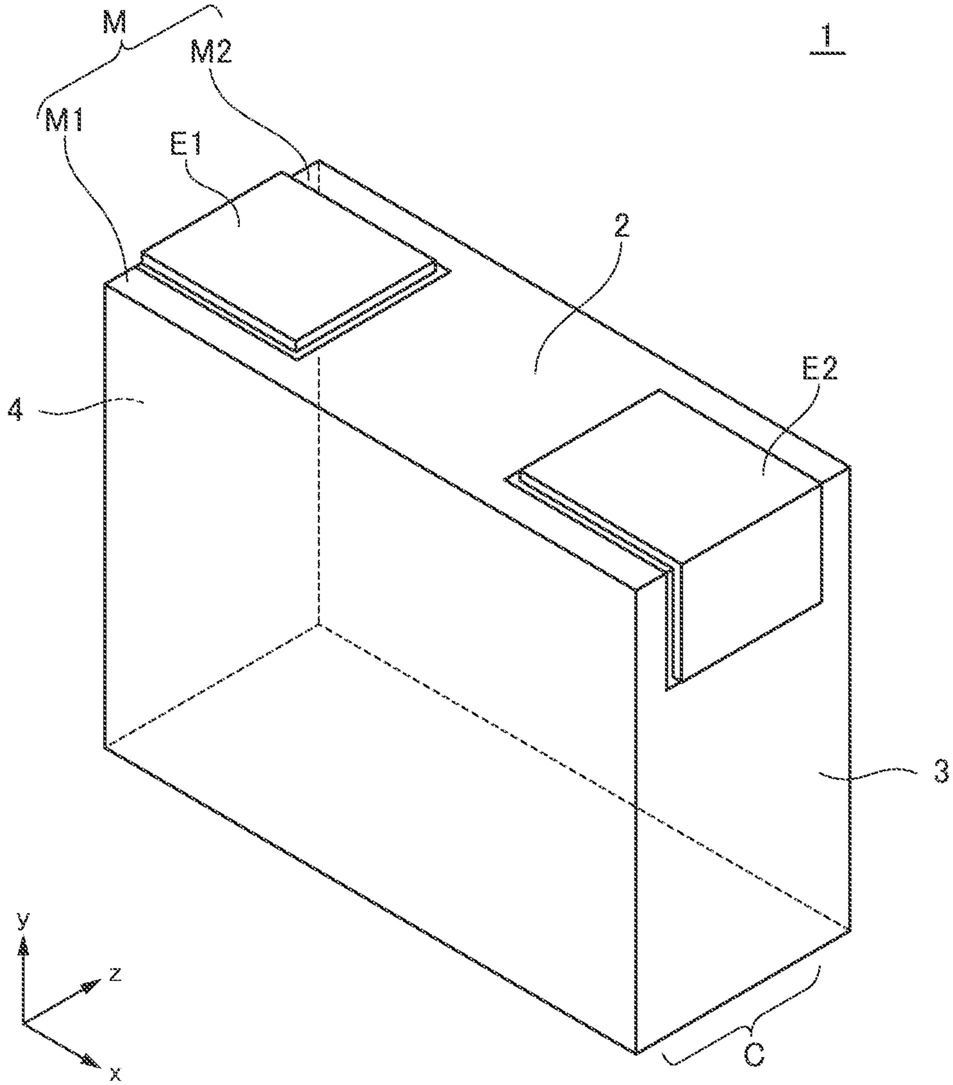
FIG. 1 is a schematic perspective view illustrating the outer appearance of a coil component 1 according to a preferred embodiment of the present invention.

FIG. 1 is a schematic perspective view illustrating the outer appearance of a coil component 1 according to a preferred embodiment of the present invention.

The coil component 1 according to the present embodiment is a surface-mount chip component suitably used as an inductor for a power supply circuit and has a magnetic element body M including first and second magnetic material layers M1, M2 and a coil part C sandwiched between the first and second magnetic material layers M1 and M2 as illustrated in FIG. 1. In the present embodiment, the coil part C has a configuration in which four conductive layers each having a spiral conductor pattern are laminated to form one coil conductor. One end of the coil conductor is connected to a first external terminal E1, and the other end thereof is connected to a second external terminal E2. Detailed configuration of the coil part C will be described later.

The magnetic element body M including the magnetic material layers M1 and M2 is a composite member formed from resin containing metal magnetic powder made of iron (Fe) or a permalloy-based material and constitutes a magnetic path for magnetic flux which is generated when current is made to flow in the coil. As the resin, epoxy resin of liquid or powder is preferably used.

Unlike a common laminated coil component, the coil component 1 according to the present embodiment is vertically mounted such that the z-direction, which is the lamination direction, is parallel to a circuit board. Specifically, a surface 2 of the magnetic element body M that constitutes the xz plane is used as a mounting surface. On the mounting surface 2, the first and second external terminals E1 and E2 are provided. The first external terminal E1 is connected with one end of the coil conductor formed in the coil part C, and the second external terminal E2 is connected with the other end of the coil conductor formed in the coil part C.

As illustrated in FIG. 1, the first external terminal E1 is continuously formed from the surface 2 to a surface 3 constituting the yz plane, and the second external terminal E2 is continuously formed from the surface 2 to a surface 4 constituting the yz plane. The external terminals E1 and E2 are each constituted of a laminated film of nickel (Ni) and tin (Sn) formed on the exposed surfaces of electrode patterns included in the coil part C.

Figure 2:
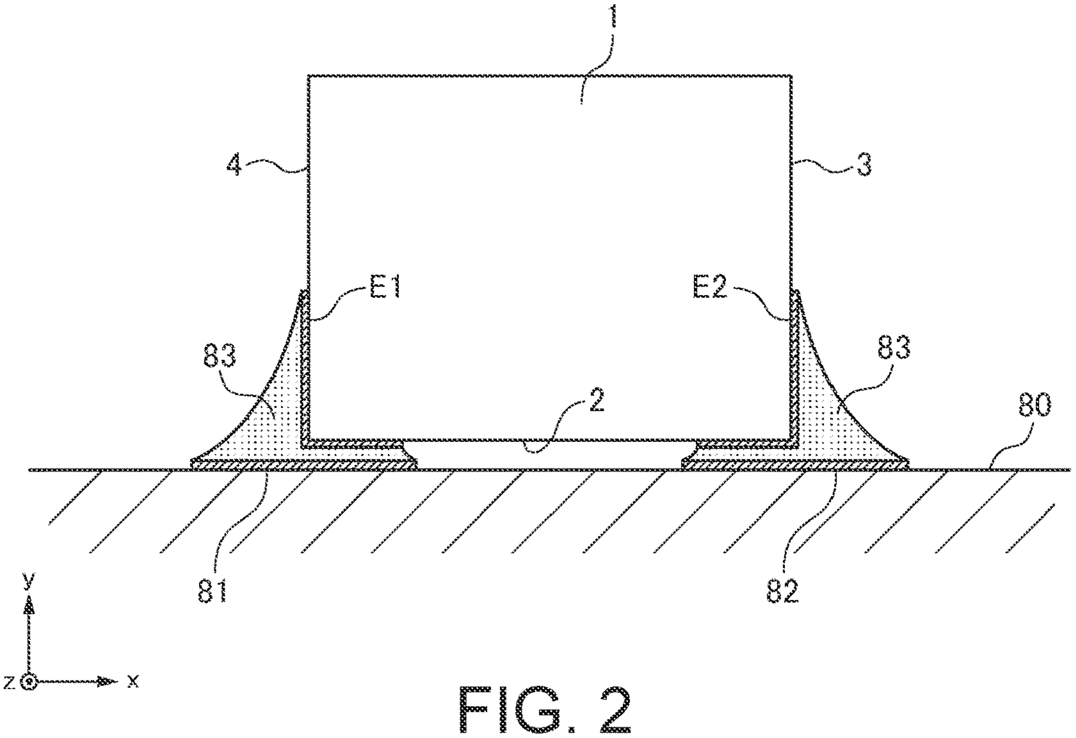
FIG. 2 is a side view illustrating a state where the coil component 1 according to the present embodiment is mounted on a circuit board 80 as viewed in the lamination direction.

FIG. 2 is a side view illustrating a state where the coil component 1 according to the present embodiment is mounted on a circuit board 80 as viewed in the lamination direction.

As illustrated in FIG. 2, the coil component 1 according to the present embodiment is mounted vertically on the circuit board 80. Specifically, the coil component 1 is mounted such that the surface 2 of the magnetic element body M faces the mounting surface of the circuit board 80, that is, the z-direction, which is the lamination direction of the coil component 1, is parallel to the mounting surface of the circuit board 80.

The circuit board 80 has land patterns 81 and 82, which are connected with the external terminals E1 and E2 of the coil component 1, respectively. The electrical/mechanical connection between the land patterns 81, 82 and the external terminals E1, E2 is achieved by solder 83. A fillet of the solder 83 is formed on a part of the external terminal E1 (E2) that is formed on the surface 3 (4). The external terminals E1 and E2 are each constituted of a laminated film of nickel (Ni) and tin (Sn), whereby wettability of the solder is enhanced.

Figure 3:
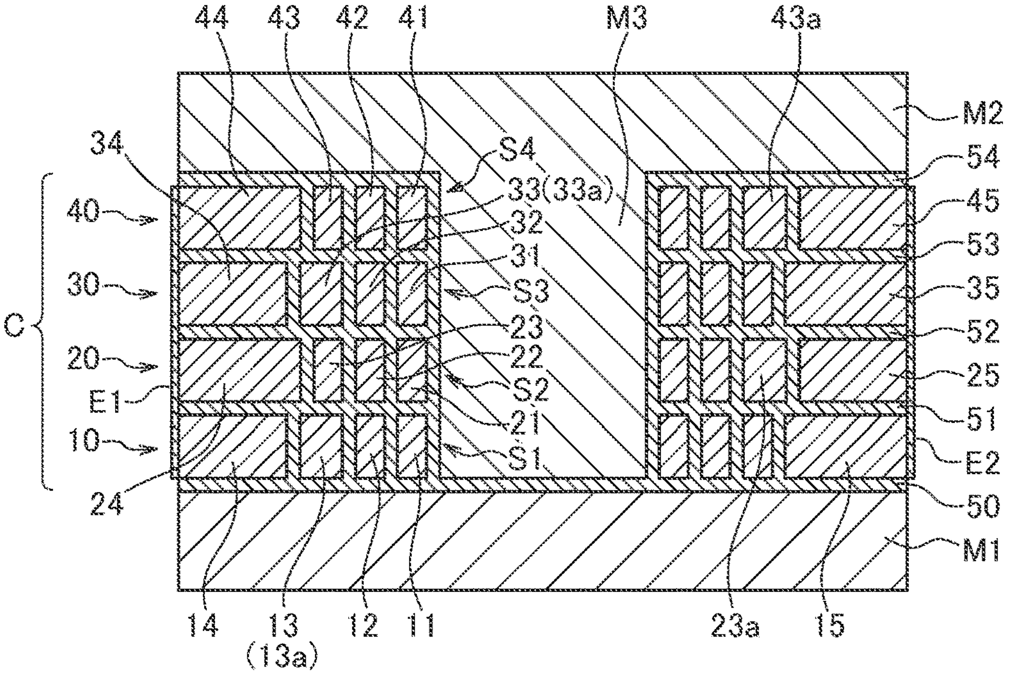
FIG. 3 is a cross-sectional view of the coil component 1 according to the present embodiment.

FIG. 3 is a cross-sectional view of the coil component 1 according to the present embodiment.

As illustrated in FIG. 3, the coil part C included in the coil component 1 is sandwiched between the two magnetic material layers M1 and M2 and has a configuration in which insulating resin layers 50 to 54 and conductive layers 10, 20, 30, and 40 are alternately laminated. The conductive layers 10, 20, 30, and 40 have spiral conductor patterns S1 to S4, respectively, and the surfaces of turns constituting the spiral conductor patterns S1 to S4 are covered with the insulating resin layers 50 to 54.

The spiral conductor patterns S1 to S4 are connected to one another through through holes formed in the insulating resin layers 51 to 53 to thereby form a coil conductor. As the material of the conductive layers 10, 20, 30, and 40, copper (Cu) is preferably used. A magnetic member M3 made of the same material as the magnetic material layer M2 is embedded in the inner diameter portion of the coil. The magnetic member M3 also constitutes a part of the magnetic element body M together with the magnetic material layers M1 and M2. Of the insulating resin layers 50 to 54, at least the insulating resin layers 51 to 53 are each made of a non-magnetic material. A magnetic material may be used for the lowermost insulating resin layer 50 and the uppermost insulating resin layer 54.

The conductive layer 10 is the first conductive layer formed on the upper surface of the magnetic material layer M1 through the insulating resin layer 50. The conductive layer 10 has a spiral conductor pattern S1 having three turns 11 to 13 and two electrode patterns 14 and 15. Although the spiral conductor pattern S1 and the electrode pattern 14 are separated from each other in the cross section illustrated in FIG. 3, they are connected to each other in another cross section as will be described later. On the other hand, the electrode pattern 15 is independent of the spiral conductor pattern S1. The electrode pattern 14 is exposed from the coil part C, and the external terminal E1 is formed on the exposed surface of the electrode pattern 14. The electrode pattern 15 is exposed from the coil part C, and the external terminal E2 is formed on the exposed surface of the electrode pattern 15.

In the conductive layer 10, a part of the outermost turn 13 of the spiral conductor pattern S1 that is adjacent to the electrode pattern 14 is partially increased in pattern width to serve as a widened part 13*a*. Accordingly, the inner wall surface part of the electrode pattern 14 is partially set back radially outward, whereby interference between the widened part 13*a* of the outermost turn 13 and the electrode pattern 14 is prevented. On the other hand, a part of the outermost turn 13 of the spiral conductor pattern S1 that is adjacent to the electrode pattern 15 is substantially constant in pattern width and has thus no widened part.

The conductive layer 20 is the second conductive layer formed on the upper surface of the conductive layer 10 through the insulating resin layer 51. The conductive layer 20 has a spiral conductor pattern S2 having three turns 21 to 23 and two electrode patterns 24 and 25. The electrode patterns 24 and 25 are both independent of the spiral conductor pattern S2. The electrode pattern 24 is exposed from the coil part C, and the external terminal E1 is formed on the exposed surface of the electrode pattern 24. The electrode pattern 25 is exposed from the coil part C, and the external terminal E2 is formed on the exposed surface of the electrode pattern 25.

In the conductive layer 20, a part of the outermost turn 23 of the spiral conductor pattern S2 that is adjacent to the electrode pattern 25 is partially increased in pattern width to serve as a widened part 23*a*. Accordingly, the inner wall surface part of the electrode pattern 25 is partially set back radially outward, whereby interference between the widened part 23*a* of the outermost turn 23 and the electrode pattern 25 is prevented. On the other hand, a part of the outermost turn 23 of the spiral conductor pattern S2 that is adjacent to the electrode pattern 24 is substantially constant in pattern width and has thus no widened part.

The conductive layer 30 is the third conductive layer formed on the upper surface of the conductive layer 20 through the insulating resin layer 52. The conductive layer 30 has a spiral conductor pattern S3 having three turns 31 to 33 and two electrode patterns 34 and 35. The electrode patterns 34 and 35 are both independent of the spiral conductor pattern S3. The electrode pattern 34 is exposed from the coil part C, and the external terminal E1 is formed on the exposed surface of the electrode pattern 34. The electrode pattern 35 is exposed from the coil part C, and the external terminal E2 is formed on the exposed surface of the electrode pattern 35.

In the conductive layer 30, a part of the outermost turn 33 of the spiral conductor pattern S3 that is adjacent to the electrode pattern 34 is partially increased in pattern width to serve as a widened part 33*a*. Accordingly, the inner wall surface part of the electrode pattern 34 is partially set back radially outward, whereby interference between the widened part 33*a* of the outermost turn 33 and the electrode pattern 34 is prevented. On the other hand, a part of the outermost turn 33 of the spiral conductor pattern S3 that is adjacent to the electrode pattern 35 is substantially constant in pattern width and has thus no widened part.

The conductive layer 40 is the fourth conductive layer formed on the upper surface of the conductive layer 30 through the insulating resin layer 53. The conductive layer 40 has a spiral conductor pattern S4 having three turns 41 to 43 and two electrode patterns 44 and 45. Although the spiral conductor pattern S4 and the electrode pattern 45 are separated from each other in the cross section illustrated in FIG. 3, they are connected to each other in another cross section as described later. On the other hand, the electrode pattern 44 is independent of the spiral conductor pattern S4. The electrode pattern 44 is exposed from the coil part C, and the external terminal E1 is formed on the exposed surface of the electrode pattern 44. The electrode pattern 45 is exposed from the coil part C, and the external terminal E2 is formed on the exposed surface of the electrode pattern 45.

In the conductive layer 40, a part of the outermost turn 43 of the spiral conductor pattern S4 that is adjacent to the electrode pattern 45 is partially increased in pattern width to serve as a widened part 43*a*. Accordingly, the inner wall surface part of the electrode pattern 45 is partially set back radially outward, whereby interference between the widened part 43*a* of the outermost turn 43 and the electrode pattern 45 is prevented. On the other hand, a part of the outermost turn 43 of the spiral conductor pattern S4 that is adjacent to the electrode pattern 44 is substantially constant in pattern width and has thus no widened part.

The spiral conductor patterns S1 to S4 are connected to one another through not-shown via conductors formed penetrating the insulating resin layers 51 to 53. As a result, a coil conductor having 12 turns is formed by the spiral conductor patterns S1 to S4, and one and the other ends of the coil conductor are connected to the external terminals E1 and E2, respectively.

Figure 4:
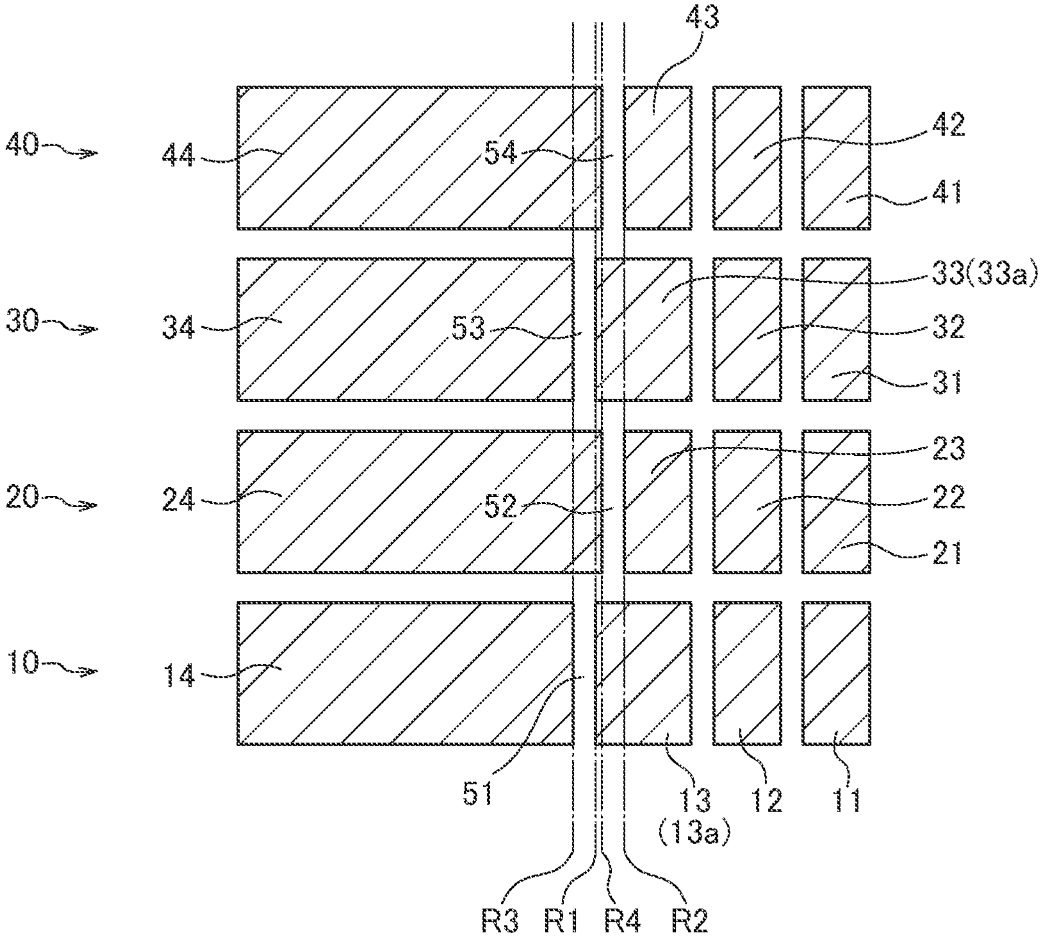
FIG. 4 is a partially enlarged view of the conductive layers 10, 20, 30, and 40.

FIG. 4 is a partially enlarged view of the conductive layers 10, 20, 30, and 40.

As illustrated in FIG. 4, the innermost turns 11, 21, 31, and 41 of the conductive layers 10, 20, 30, and 40 are at the same position as viewed in the lamination direction, and the intermediate turns 12, 22, 32, and 42 of the conductive layers 10, 20, 30, and 40 are at the same position as viewed in the lamination direction. On the other hand, the outermost turns 13, 23, 33, and 43 of the conductive layers 10, 20, 30, and 40 are laid out such that the radial positions of the outer wall surface parts thereof are arranged in a zigzag line on the side adjacent to the electrode patterns 14, 24, 34, and 44. Although not illustrated in FIG. 4, the radial positions of the outer wall surface parts of the outermost turns 13, 23, 33, and 43 are also arranged in a zigzag line on the side adjacent to the electrode patterns 15, 25, 35, and 45.

More specifically, in the cross section illustrated in FIG. 4, a radial position R1 corresponding to the outer wall surface parts of the widened parts 13*a* and 33*a* included in the outermost turns 13 and 33 is positioned radially outward of a radial position R2 corresponding to the outer wall surface parts of the outermost turns 23 and 43. Accordingly, a radial position R3 corresponding to the inner wall surface parts of the electrode patterns 14 and 34 is positioned radially outward of a radial position R4 corresponding to the inner wall surface parts of the electrode patterns 24 and 44. This reduces the overlap in the lamination direction of the insulating resin layers 51 to 54 positioned between the outermost turns 13, 23, 33, and 43 and the electrode patterns 14, 24, 34, and 44, thereby allowing relief of stress concentration due to overlap of the insulating resin layers 51 to 54 in the lamination direction.

That is, when the insulating resin layers 51 to 54 overlap one another in the lamination direction, they may significantly expand or contract in the lamination direction at the overlap due to a temperature change, with the result that a stress is applied to the interface with the conductive layers 10, 20, 30, and 40, which may cause cracks at the interface in some cases. In particular, the electrode patterns 14, 24, 34, and 44 (electrode patterns 15, 25, 35, and 45) are larger in pattern width than the spiral conductor patterns S1 to S4, so that when a temperature change occurs, a high stress is applied to the interface between the electrode patterns 14, 24, 34, and 44 (electrode pattern 15, 25, 35, and 45) and the insulating resin layers 51 to 54.

However, in the present embodiment, the outer wall surface parts of the outermost turns 13, 23, 33, and 43 are arranged in a zigzag line, which reduces the overlap in the lamination direction of the insulating resin layers 51 to 54 positioned between the outermost turns 13, 23, 33, and 43 and the electrode patterns 14, 24, 34, and 44 (electrode patterns 15, 25, 35, and 45), thereby preventing the occurrence of cracks due to a temperature change. On the other hand, the inner wall surface parts of the outermost turns 13, 23, 33, and 43 are at the same radial position.

The insulating resin layers 51 to 54 embedded between the outermost turns 13, 23, 33, and 43 and the electrode patterns 14, 24, 34, and 44 have substantially the same thickness in the radial direction. This means that the difference between the R1 and the R3 and the difference between the R2 and the R4 are substantially the same. By setting the difference between the R1 and the R3 and the difference between the R2 and the R4 to, for example, a minimum value in a manufacturing process, the outer dimension of the coil component 1 can be reduced.

In FIG. 4, which is a first example, the radial positions R2, R4, R1, and R3 are arranged in this order from inside to outside. Thus, the outer wall surface parts (R1) of the outermost turns 13 and 33 and the inner wall surface parts (R3) of the electrode patterns 14 and 34 both overlap the electrode patterns 24 and 44, and the outer wall surface parts (R2) of the outermost turns 23 and 43 and the inner wall surface parts (R4) of the electrode patterns 24 and 44 both overlap the outermost turns 13 and 33. As a result, in the cross section illustrated in FIG. 4, the insulating resin layers 51 to 54 do not overlap each other in the lamination direction.

For example, when the space between the outermost turns 13, 23, 33, and 43 and the electrode patterns 14, 24, 34, and 44 is set to 15 μm, the difference between the R1 and the R4, i.e., the overlap width between the outermost turns 13 and 33 and the electrode patterns 24 and 44 as viewed in the lamination direction can be set to about 2 μm.

When the outermost turns 13, 23, 33, and 43 and the electrode patterns 14, 24, 34, and 44 (electrode patterns 15, 25, 35, and 45) are laid out in a zigzag manner such that the outermost turns 13 and 33 and the electrode patterns 24 and 44 overlap each other as viewed in the lamination direction as in the first example illustrated in FIG. 4, the insulating resin layers 51 to 54 do not overlap one another in the cross section illustrated in FIG. 4 even when some misalignment occurs in a manufacturing process. This can prevent stress concentration due to overlap of the insulating resin layers 51 to 54 in the lamination direction.

Figure 5:
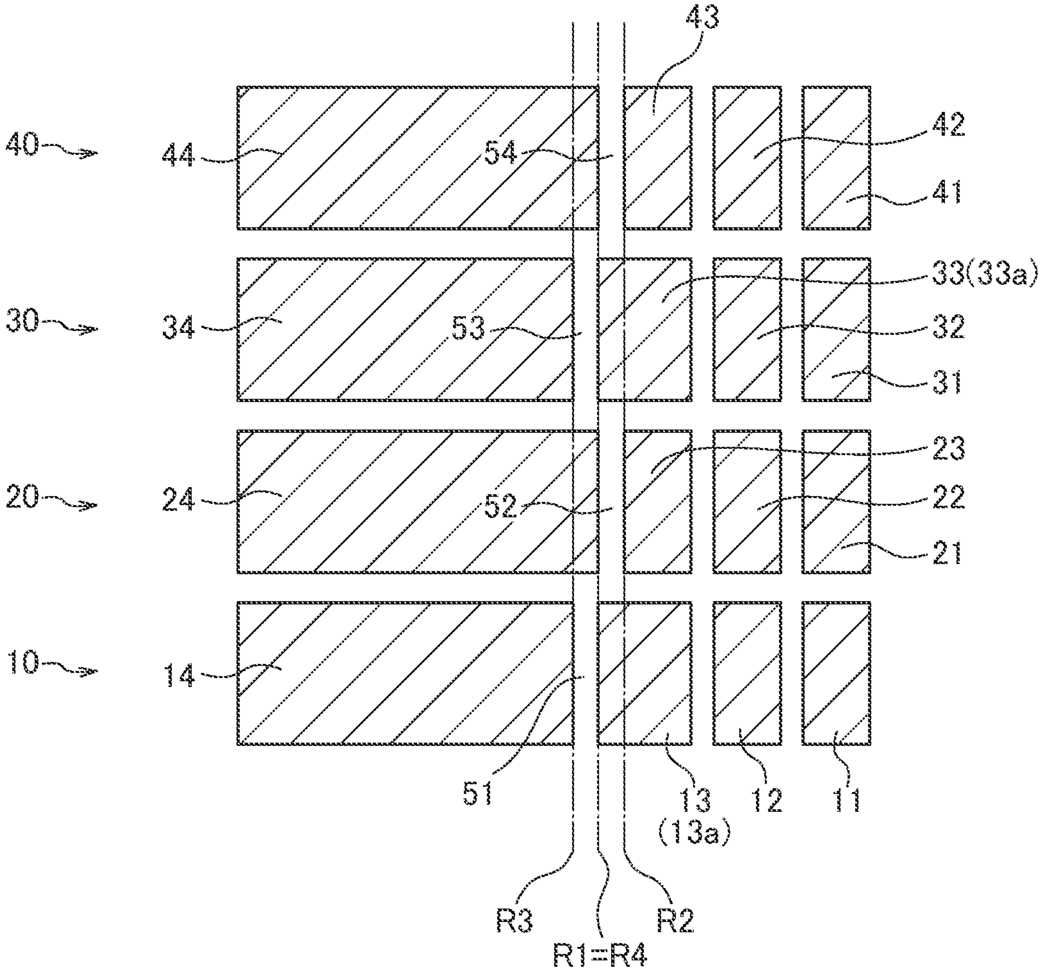
FIG. 5 is a partially enlarged view of the conductive layers 10, 20, 30, and 40 according to a second example.

FIG. 5 is a partially enlarged view of the conductive layers 10, 20, 30, and 40 according to a second example.

In the second example illustrated in FIG. 5, the radial position R1 corresponding to the outer wall surface parts of the outermost turns 13 and 33 and the radial position R4 corresponding to the inner wall surface parts of the electrode patterns 24 and 44 coincide with each other. Even in such a case, the insulating resin layers 51 to 54 do not overlap one another in the lamination direction in the cross section illustrated in FIG. 4, so that it is possible to prevent stress concentration due to overlap of the insulating resin layer 51 to 54 in the lamination direction.

Figure 6:
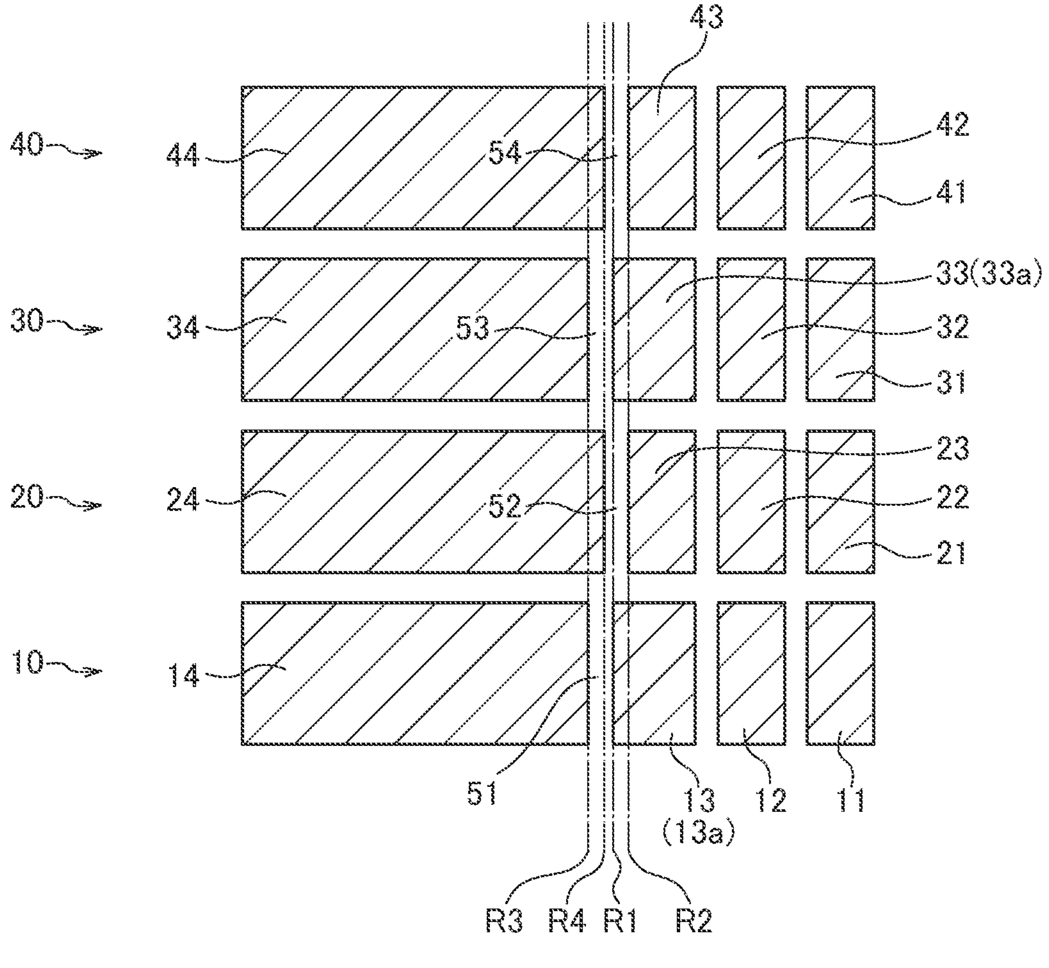
FIG. 6 is a partially enlarged view of the conductive layers 10, 20, 30, and 40 according to a third example.

FIG. 6 is a partially enlarged view of the conductive layers 10, 20, 30, and 40 according to a third example.

In the third example illustrated in FIG. 6, the radial positions R2, R1, R4, and R3 are arranged in this order from inside to outside. Thus, the inner wall surface parts (R3) of the electrode patterns 14 and 34 overlap the electrode patterns 24 and 44, and the outer wall surface parts (R2) of the outermost turns 23 and 43 overlap the outermost turns 13 and 33. In this case, the insulating resin layers 51 to 54 partially overlap one another in the cross section illustrated in FIG. 4; however, the overlap amount, which is determined by the difference between the R1 and the R4, is smaller than in the case where the zigzag layout is not adopted, thus allowing relief of stress concentration due to overlap of the insulating resin layers 51 to 54 in the lamination direction.

The following describes a manufacturing method for the coil component 1 according to the present embodiment.

FIGS. 7A to 7E and FIGS. 8A to 8D are process views for explaining the manufacturing method for the coil component 1 according to the present embodiment. FIGS. 9A to 9D are plan views for explaining a pattern shape in each process.

Figure 7A:
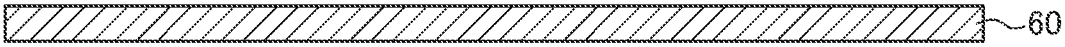
FIGS. 7A to 7E are process views for explaining the manufacturing method for the coil component 1 according to the present embodiment.
Figure 7B:
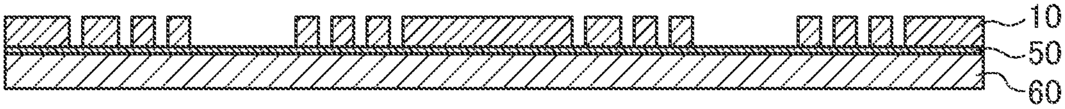

As illustrated in FIG. 7A, a support substrate 60 having a predetermined strength is prepared, and a resin material is applied on the upper surface of the support substrate 60 by a spin coating method to form the insulating resin layer 50. Then, as illustrated in FIG. 7B, the conductive layer 10 is formed on the upper surface of the insulating resin layer 50. Preferably, as the formation method for the conductive layer 10, a base metal film is formed using a thin-film formation process such as sputtering, and then copper (Cu) is grown by plating to a desired film thickness using an electroplating method. The conductive layers 20, 30, and 40 to be formed subsequently are formed in the same manner.

Figure 9A:
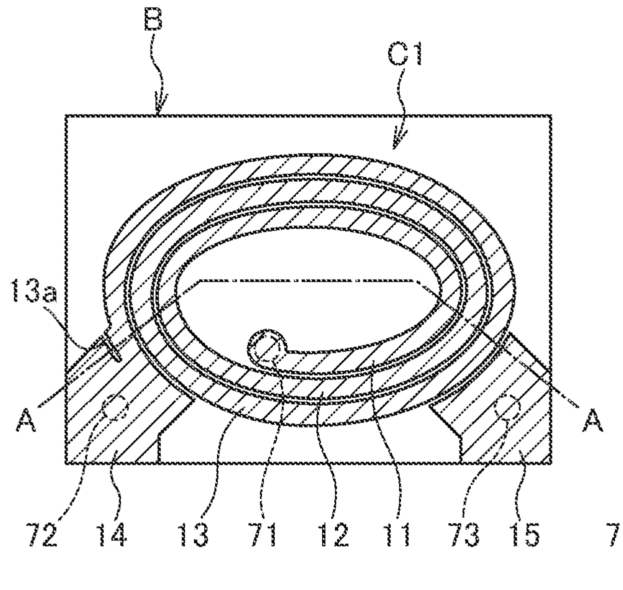
FIGS. 9A to 9D are plan views for explaining a pattern shape in each process.

The conductive layer 10 has a planar shape as illustrated in FIG. 9A and includes the spiral conductor pattern S1 spirally wound in three turns and two electrode patterns 14 and 15. The line A-A illustrated in FIG. 9A denotes the cross-sectional position of FIG. 3, and the reference symbol B denotes the final product area of the coil component 1. As illustrated in FIG. 9A, the widened part 13*a*, which is included in the outermost turn 13 of the spiral conductor pattern S1 and adjacent to the electrode pattern 14, is widened radially outward.

Figure 7C:
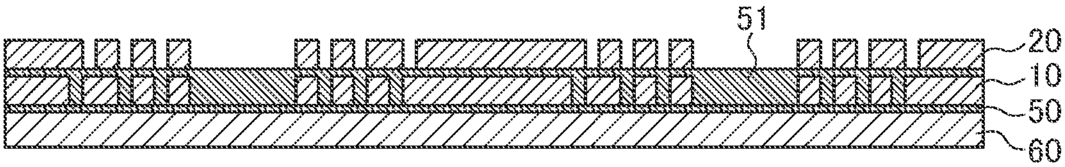

Then, as illustrated in FIG. 7C, the insulating resin layer 51 that covers the conductive layer 10 is formed. Preferably, in the formation of the insulating resin layer 51, a resin material is applied by a spin coating method, and then patterning is performed by photolithography. The insulating resin layers 52 to 54 to be formed subsequently are formed in the same manner. The insulating resin layer 51 has not-shown three through holes through which the conductive layer 10 is exposed. The reference numerals 71 to 73 illustrated in FIG. 9A are portions at which the conductive layer 10 is exposed through the through holes formed in the insulating resin layer 51, the portions being at the inner peripheral end of the spiral conductor pattern S1, electrode pattern 14, and electrode pattern 15.

Figure 9B:
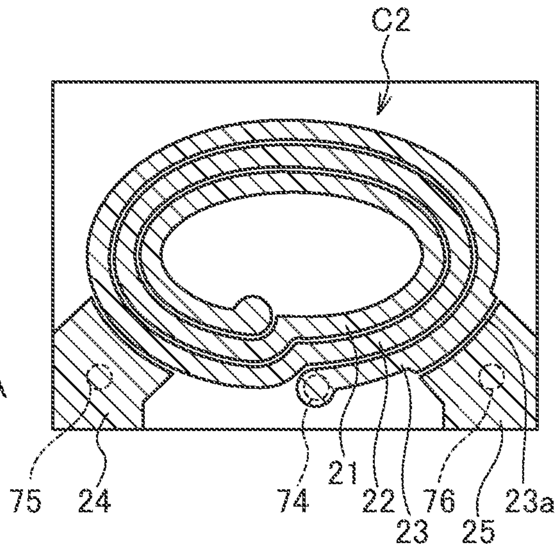

Then, as illustrated in FIG. 7C, the conductive layer 20 is formed on the upper surface of the insulating resin layer 51. The conductive layer 20 has a planar shape as illustrated in FIG. 9B and includes the spiral conductor pattern S2 spirally wound in three turns and two electrode patterns 24 and 25. Thus, through the three through holes formed in the insulating resin layer 51, the inner peripheral end of the spiral conductor pattern S2 is connected to the inner peripheral end of the spiral conductor pattern S1, the electrode pattern 24 is connected to the electrode pattern 14, and the electrode pattern 25 is connected to the electrode pattern 15. As illustrated in FIG. 9B, the widened part 23*a*, which is included in the outermost turn 23 of the spiral conductor pattern S2 and adjacent to the electrode pattern 25, is widened radially outward.

Figure 7D:
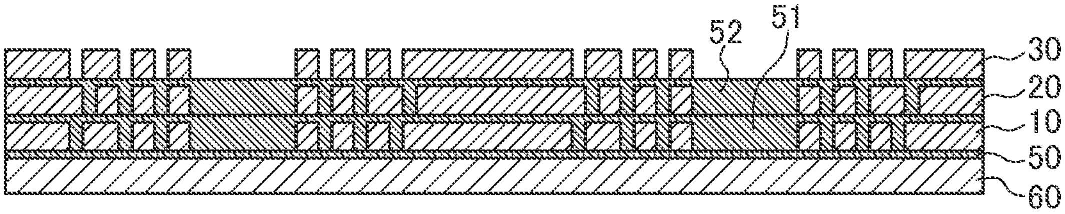

Then, as illustrated in FIG. 7D, the insulating resin layer 52 that covers the conductive layer 20 is formed. The insulating resin layer 52 has not-shown three through holes through which the conductive layer 20 is exposed. The reference numerals 74 to 76 illustrated in FIG. 9B are portions at which the conductive layer 20 is exposed through the through holes formed in the insulating resin layer 52, the portions being at the outer peripheral end of the spiral conductor pattern S2, electrode pattern 24, and electrode pattern 25.

Figure 9C:
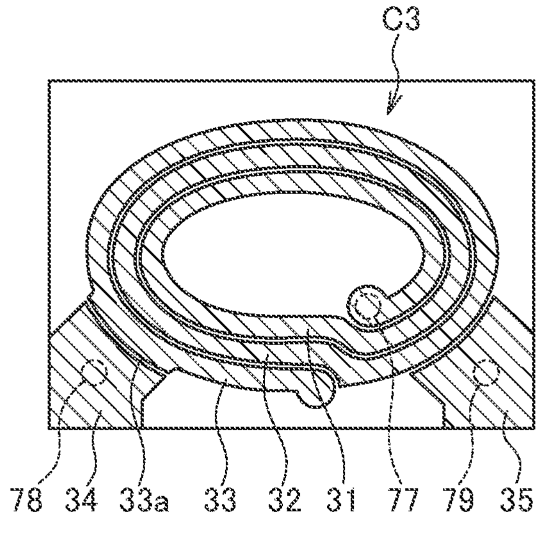

Then, as illustrated in FIG. 7D, the conductive layer 30 is formed on the upper surface of the insulating resin layer 52. The conductive layer 30 has a planar shape as illustrated in FIG. 9C and includes the spiral conductor pattern S3 spirally wound in three turns and two electrode patterns 34 and 35. Thus, through the three through holes formed in the insulating resin layer 52, the outer peripheral end of the spiral conductor pattern S3 is connected to the outer peripheral end of the spiral conductor pattern S2, the electrode pattern 34 is connected to the electrode pattern 24, and the electrode pattern 35 is connected to the electrode pattern 25. As illustrated in FIG. 9C, the widened part 33*a*, which is included in the outermost turn 33 of the spiral conductor pattern S3 and adjacent to the electrode pattern 34, is widened radially outward.

Figure 7E:
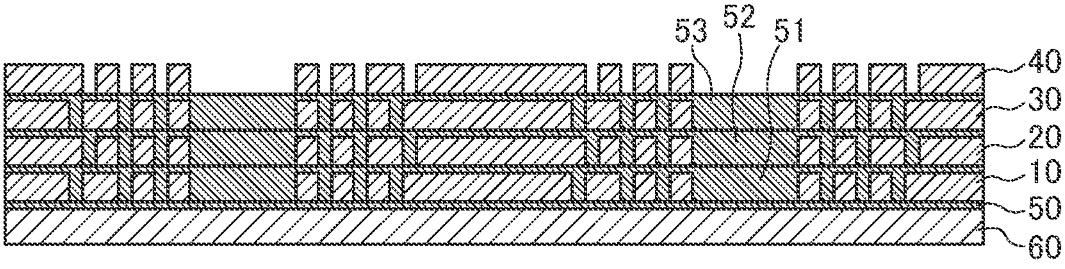

Then, as illustrated in FIG. 7E, the insulating resin layer 53 that covers the conductive layer 30 is formed. The insulating resin layer 53 has not-shown three through holes through which the conductive layer 30 is exposed. The reference numerals 77 to 79 illustrated in FIG. 9C are portions at which the conductive layer 30 is exposed through the through holes formed in the insulating resin layer 53, the portions being at the inner peripheral end of the spiral conductor pattern S3, electrode pattern 34, and electrode pattern 35.

Figure 9D:
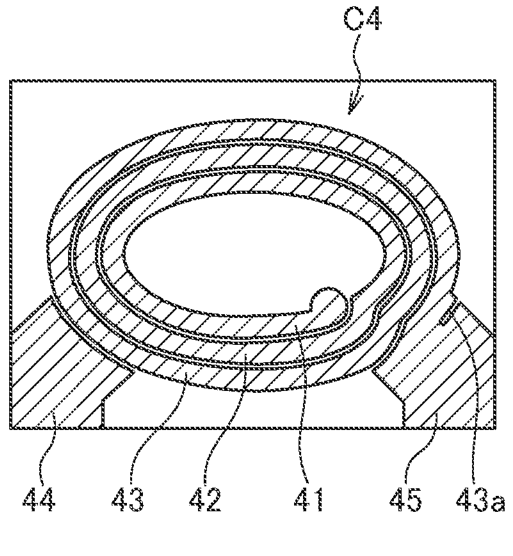

Then, as illustrated in FIG. 7E, the conductive layer 40 is formed on the upper surface of the insulating resin layer 53. The conductive layer 40 has a planar shape as illustrated in FIG. 9D and includes the spiral conductor pattern S4 spirally wound in three turns and two electrode patterns 44 and 45. Thus, through the three through holes formed in the insulating resin layer 53, the inner peripheral end of the spiral conductor pattern S4 is connected to the inner peripheral end of the spiral conductor pattern S3, the electrode pattern 44 is connected to the electrode pattern 34, and the electrode pattern 45 is connected to the electrode pattern 35. As illustrated in FIG. 9D, the widened part 43*a*, which is included in the outermost turn 43 of the spiral conductor pattern S4 and adjacent to the electrode pattern 45, is widened radially outward.

Figure 8A:
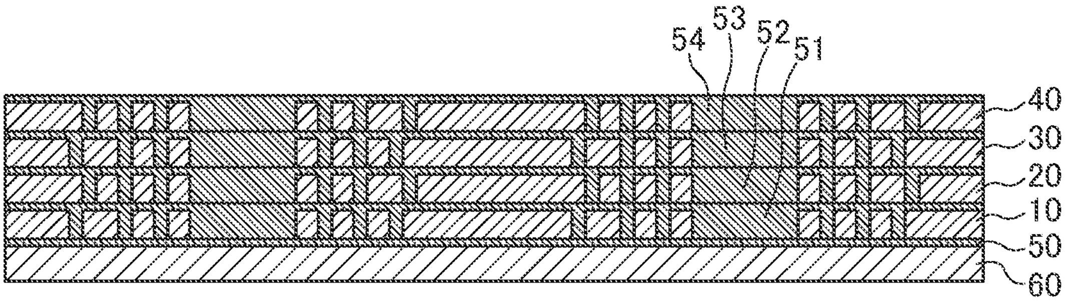
FIGS. 8A to 8D are process views for explaining the manufacturing method for the coil component 1 according to the present embodiment.
Figure 8B:
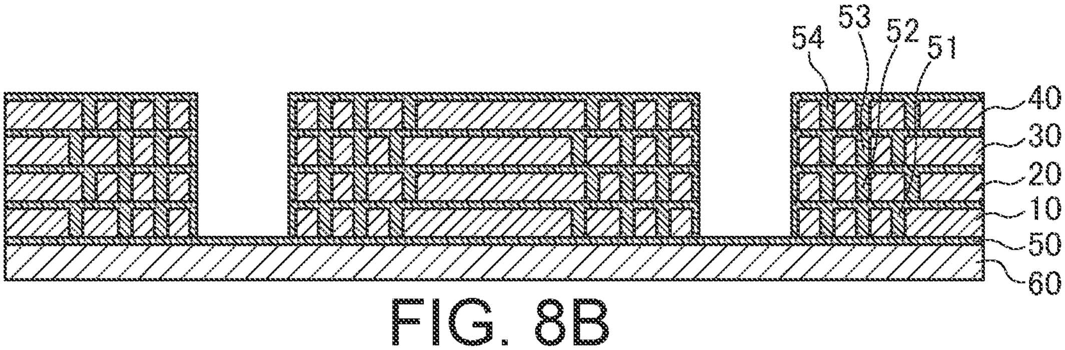

Then, as illustrated in FIG. 8A, the insulating resin layer 54 that covers the conductive layer 40 is formed on the entire surface. After that, as illustrated in FIG. 8B, the parts of the insulating resin layers 51 to 54 that are formed in the inner diameter areas of the spiral conductor patterns S1 to S4 are removed. As a result, a space is formed in the inner diameter areas of the spiral conductor patterns S1 to S4.

Figure 8C:
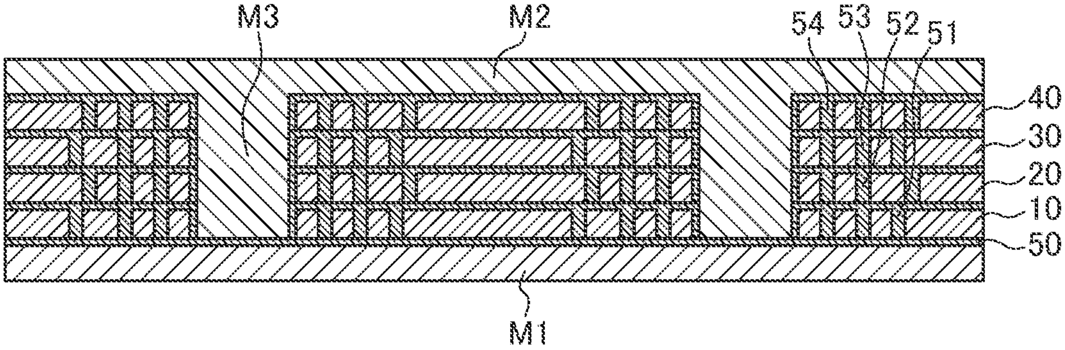

Then, as illustrated in FIG. 8C, a resin composite material containing magnetic powder is embedded in the space formed by the removal of the insulating resin layers 51 to 54. As a result, the magnetic material layer M2 is formed above the conductive layers 10, 20, 30, and 40, and the magnetic material layer M3 is formed in the inner diameter area surrounded by the spiral conductor patterns S1 to S4. Thereafter, the support substrate 60 is peeled off, and the composite member is also formed on the lower surface side of the conductive layers 10, 20, 30, and 40 to form the magnetic material layer M1.

Figure 8D:
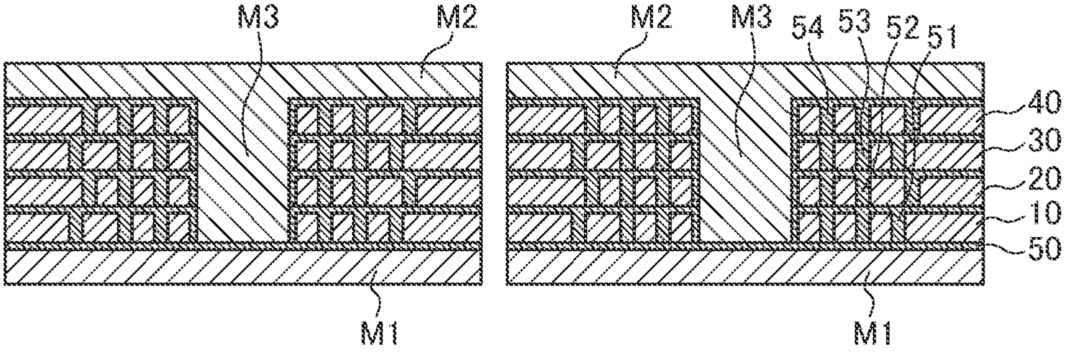

Then, as illustrated in FIG. 8D, dicing is performed for chip individualization. As a result, the electrode patterns 14, 15, 24, 25, 34, 35, 44, and 45 are partially exposed from the dicing surface. In this state, barrel plating is performed, whereby the external terminal E1 is formed on the exposed surfaces of the electrode patterns 14, 24, 34, and 44, and the external terminal E2 is formed on the exposed surfaces of the electrode patterns 15, 25, 35, and 45.

Thus, the coil component 1 according to the present embodiment is completed.

As described above, the widened parts 13*a*, 23*a*, 33*a*, and 43*a* are formed at parts of the outermost turns 13, 23, 33, 43 included in the spiral conductor patterns S1 to S4 that are adjacent to the electrode patterns 14, 25, 34, and 45. Thus, the outermost turns 13, 23, 33, and 43 can be laid out in a zigzag manner on the sides adjacent to the electrode patterns 14, 24, 34, and 44 and on the sides adjacent to the electrode patterns 15, 25, 35, and 45.

The above zigzag layout of the outermost turns 13, 23, 33, and 43 on the sides adjacent to the electrode patterns 14, 24, 34, and 44 and on the sides adjacent to the electrode patterns 15, 25, 35, and 45 reduces the overlap in the lamination direction of the insulating resin layers 51 to 54 positioned between the outermost turns 13, 23, 33, and 43 and the electrode patterns 14, 15, 24, 25, 34, 35, 44, and 45, which can prevent the occurrence of cracks due to a temperature change.

Further, in the coil component 1 according to the above embodiment, the outermost turns 13 and 33 positioned in the first and third layers have the widened parts 13*a* and 33*a* on the sides adjacent to the electrode patterns 14 and 34, and the outermost turns 23 and 43 positioned in the second and fourth layers have the widened parts 23*a* and 43*a* on the sides adjacent to the electrode patterns 25 and 45. That is, it suffices that one widened part is formed in one layer. This can minimize an increase in the outer dimension of the coil component 1 due to the presence of the widened part.

Figure 10:
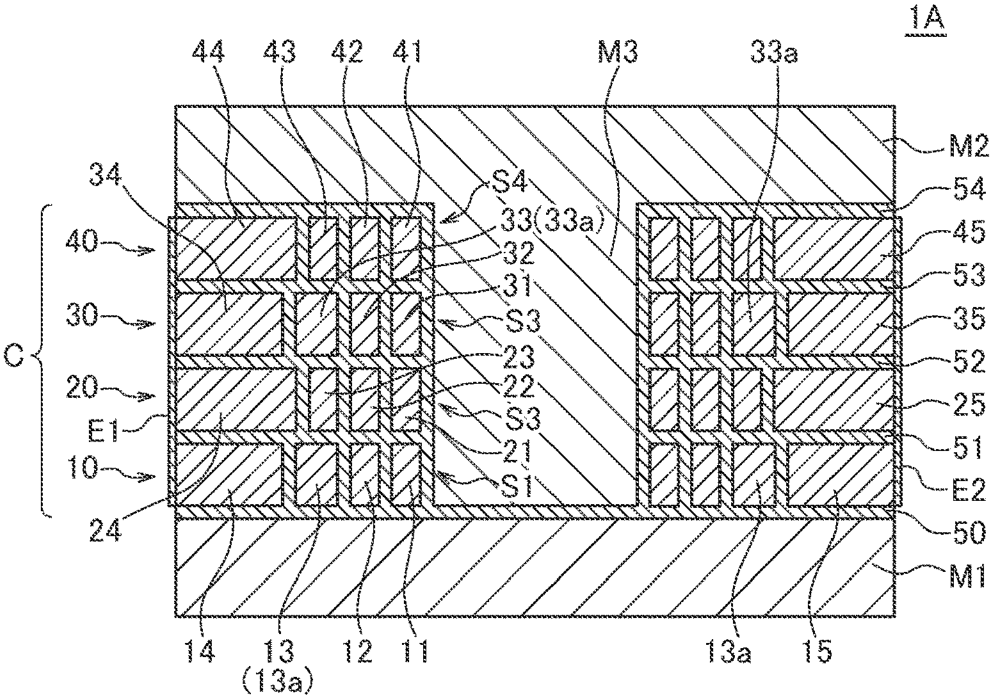
FIG. 10 is a cross-sectional view of a coil component 1A according to a first modification.

However, the above configuration is not essential in the present invention. As a coil component 1A according to a first modification illustrated in FIG. 10, the outermost turn 13 positioned in the first layer may have two widened parts 13*a*, and the outermost turn 33 positioned in the third layer may have two widened parts 33*a*. Even in such a configuration, the outermost turns 13, 23, 33, and 43 can be laid out in a zigzag manner on the sides adjacent to the electrode patterns 14, 24, 34, and 44 and on the sides adjacent to the electrode patterns 15, 25, 35, and 45.

Figure 11:
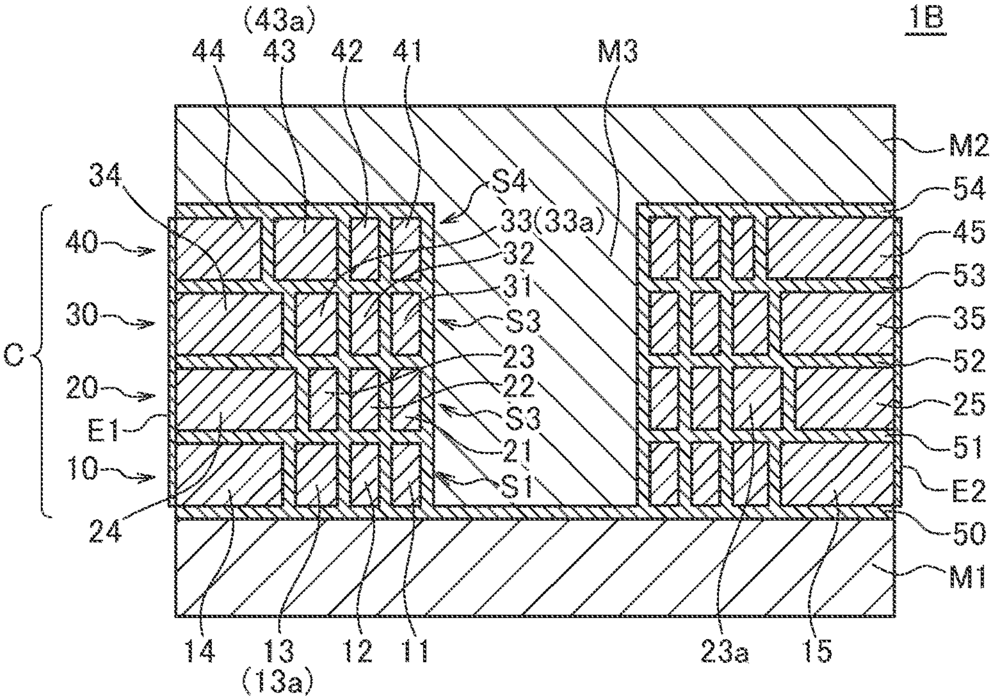
FIG. 11 is a cross-sectional view of a coil component 1B according to a second modification.

Further, as a coil component 1B according to a second modification illustrated in FIG. 11, the width of a part of the outermost turn 43 of the spiral conductor pattern S4 that is adjacent to the electrode pattern 44 may be made larger than the width of a part of the outermost turn 33 of the spiral conductor pattern S3 that is adjacent to the electrode pattern 34, and the width of a part of the outermost turn 43 of the spiral conductor pattern S4 that is adjacent to the electrode pattern 45 may be made smaller than the width of a part of the outermost turn 33 of the spiral conductor pattern S3 that is adjacent to the electrode pattern 35. This reduces the overlap of the insulating resin layers 51 to 54 in the lamination direction.

Figure 12:
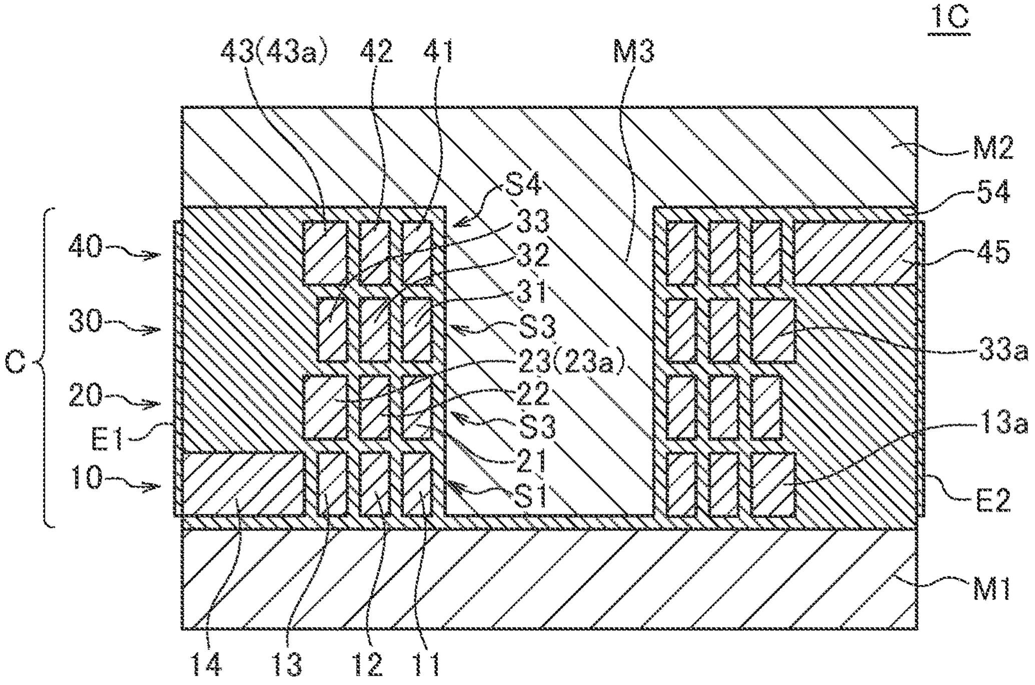
FIG. 12 is a cross-sectional view of a coil component 1C according to a third modification.

Further, as a coil component 1C according to a third modification illustrated in FIG. 12, the electrode patterns 24, 34, 35, and 44 may be omitted. In this case, the volumes of the insulating resin layers 51 to 54 increases in the outer diameter areas of the spiral conductor patterns S1 to S4. This may cause the insulating resin layers 51 to 54 to significantly expand or contract due to a temperature change; however, by laying out the outermost turns 13, 23, 33, and 43 in a zigzag manner on one sides thereof, the occurrence of cracks due to a temperature change can be prevented.

Figure 13:
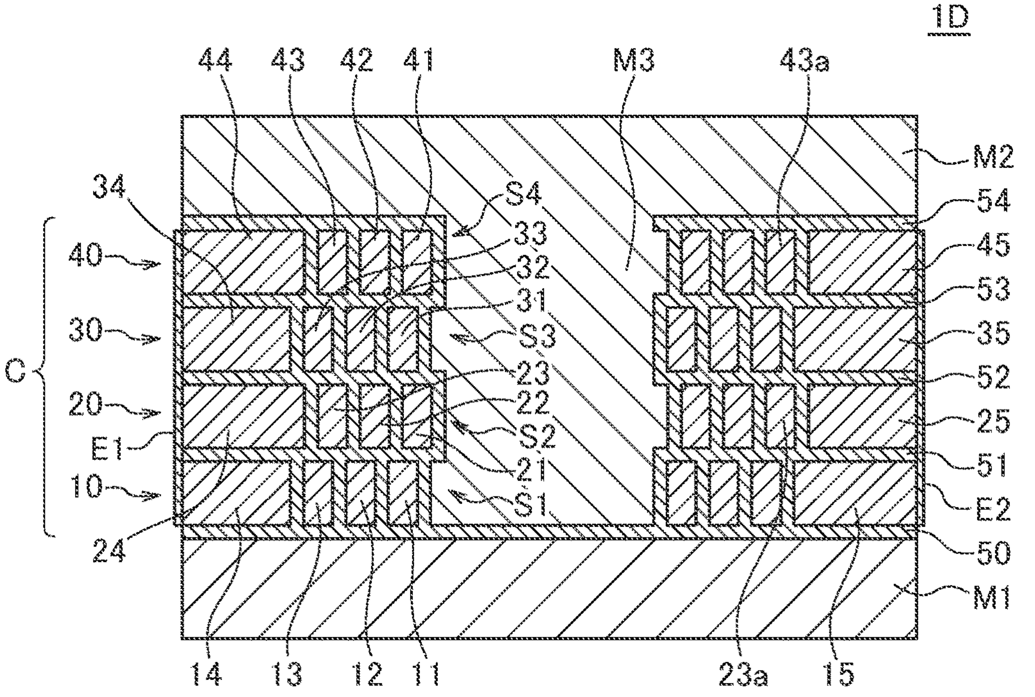
FIG. 13 is a cross-sectional view of a coil component 1D according to a fourth modification.

Further, as a coil component 1D according to a fourth modification illustrated in FIG. 13, the radial positions of the wall surfaces adjacent in the lamination direction may be different not only in the outermost turns 13, 23, 33, and 43, but also in the innermost turns 11, 21, 31, and 41 and the intermediate turns 12, 22, 32, and 42. That is, it suffices that the radial positions of the wall surfaces of any two turns adjacent and overlapping each other in the lamination direction are different.

Figure 14:
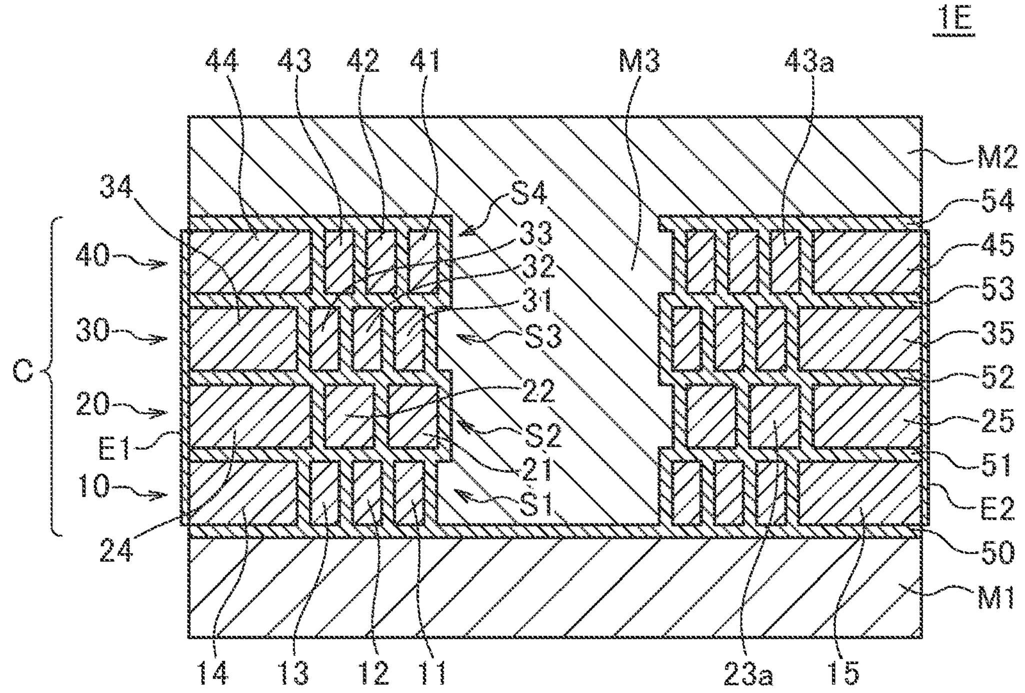
FIG. 14 is a cross-sectional view of a coil component 1E according to a fifth modification.
Figure 15:
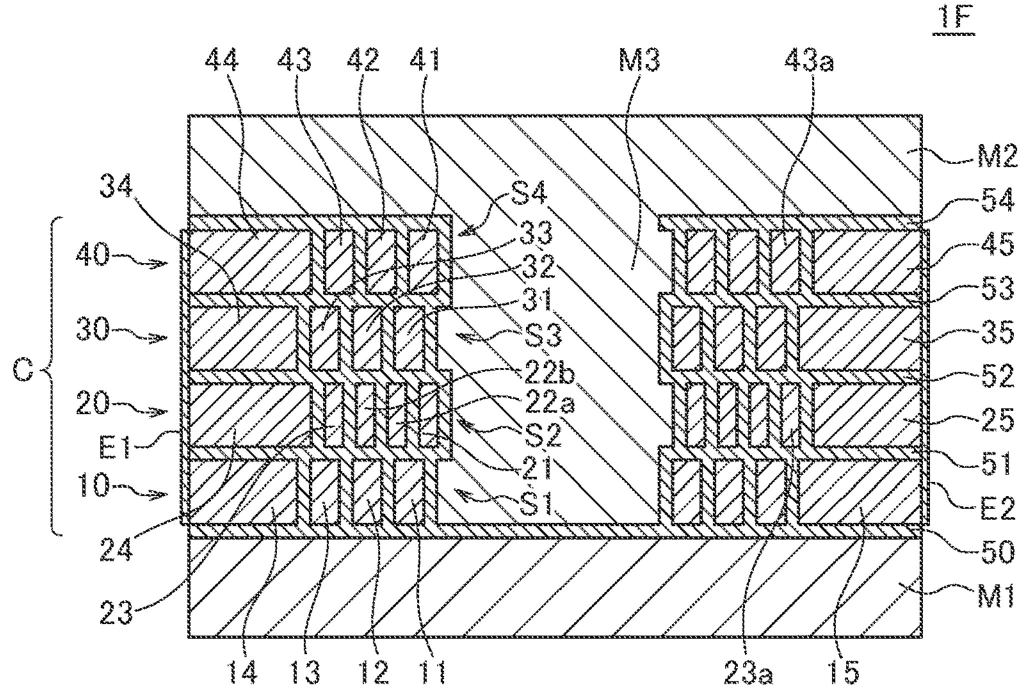
FIG. 15 is a cross-sectional view of a coil component 1F according to a sixth modification.

Further, as a coil component 1E according to a fifth modification illustrated in FIG. 14, the number of turns of a given spiral conductor pattern, e.g., the spiral conductor pattern S2 may be smaller by one or more than those of the other spiral conductor patterns S1, S3, and S4. Conversely, as a coil component 1F according to a sixth modification illustrated in FIG. 15, the number of turns of a given spiral conductor pattern, e.g., the spiral conductor pattern S2 may be larger by one or more than those of the other spiral conductor patterns S1, S3, and S4. Thus, a misalignment can be produced between the radial positions of the wall surface parts adjacent in the lamination direction by the difference in the number of turns.

While the preferred embodiments of the present invention have been described, the present invention is not limited to the above embodiments, and various modifications may be made within the scope of the present invention, and all such modifications are included in the present invention.

For example, although the coil part C includes four conductive layers 10, 20, 30, and 40 in the above embodiment, the number of conductive layers is not limited to this in the present invention. Further, the number of turns of the spiral conductor pattern formed in each conductive layer is not particularly limited.

REFERENCE SIGNS LIST

1, 1A-1F coil component
2-4 surface
10, 20, 30, 40 conductive layer
11, 21, 31, 41 innermost turn
12, 22, 32, 42 intermediate turn
13, 23, 33, 43 outermost turn
13*a*, 23*a*, 33*a*, 43*a* widened part
14, 15, 24, 25, 34, 35, 44, 45 electrode pattern
50-54 insulating resin layer
60 support substrate
71-79 portion exposed through the through hole
80 circuit board
81, 82 land patterns
83 solder
C coil part
E1, E2 external terminal
M magnetic element body
M1, M2 magnetic material layer
M3 magnetic member
S1-S4 spiral conductor pattern

What is claimed is:

1. A coil component comprising:

a plurality of laminated spiral conductor patterns; and an insulating resin layer that covers surfaces of turns constituting each of the plurality of spiral conductor patterns, wherein the plurality of spiral conductor patterns include first and second spiral conductor patterns which are adjacent to each other in a lamination direction, wherein the first spiral conductor pattern includes a first turn, wherein the second spiral conductor pattern includes a second turn that overlaps the first turn as viewed in the lamination direction, wherein a first outer wall surface part constituting a radial outer wall surface of the first turn and a second outer wall surface part constituting a radial outer wall surface of the second turn have portions different in radial position, wherein the first turn is an outermost turn of the first spiral conductor pattern, wherein the second turn is an outermost turn of the second spiral conductor pattern wherein the coil component further comprising a first electrode pattern positioned radially outside the first outer wall surface part and connected to an outer peripheral end of the first spiral conductor pattern, wherein the coil component further comprising a second electrode pattern positioned radially outside the second outer wall surface part and connected to the first electrode pattern, wherein the second outer wall surface part overlaps the outermost turn of the first spiral conductor pattern as viewed in the lamination direction, and wherein an inner wall surface part of the first electrode pattern overlaps the second electrode pattern as viewed in the lamination direction.

2. The coil component as claimed in claim 1, wherein a first inner wall surface part constituting a radial inner wall surface of the first turn and a second inner wall surface part constituting a radial inner wall surface of the second turn are at a same radial position.

3. The coil component as claimed in claim 1, wherein the first outer wall surface part overlaps the second electrode pattern as viewed in the lamination direction.

4. The coil component as claimed in claim 1, wherein a radial thickness of the insulating resin layer embedded between the first electrode pattern and the first outer wall surface part is equal to a radial thickness of the insulating resin layer embedded between the second electrode pattern and the second outer wall surface part.

5. The coil component as claimed in claim 1, wherein the plurality of spiral conductor patterns further include a third spiral conductor pattern adjacent to the second spiral conductor pattern in the lamination direction, and wherein the second outer wall surface part and a third outer wall surface part constituting a radial outer wall surface of an outermost turn of the third spiral conductor pattern have portions different in radial position.

6. The coil component as claimed in claim 5, wherein the second outer wall surface part overlaps the outermost turn of the third spiral conductor pattern as viewed in the lamination direction.

7. The coil component as claimed in claim 6, wherein the first outer wall surface part and the third outer wall surface part have portions which are a same in radial position.

8. The coil component as claimed in claim 1, wherein a number of turns of the first spiral conductor pattern and a number of turns of the second spiral conductor pattern are different by one or more.

* * * * *